D. W. SHIEK.
COMBINED COMPUTING AND LISTING MACHINE.
APPLICATION FILED FEB. 16, 1912.
1,111,867.
Patented Sept. 29, 1914.
10 SHEETS—SHEET 6.
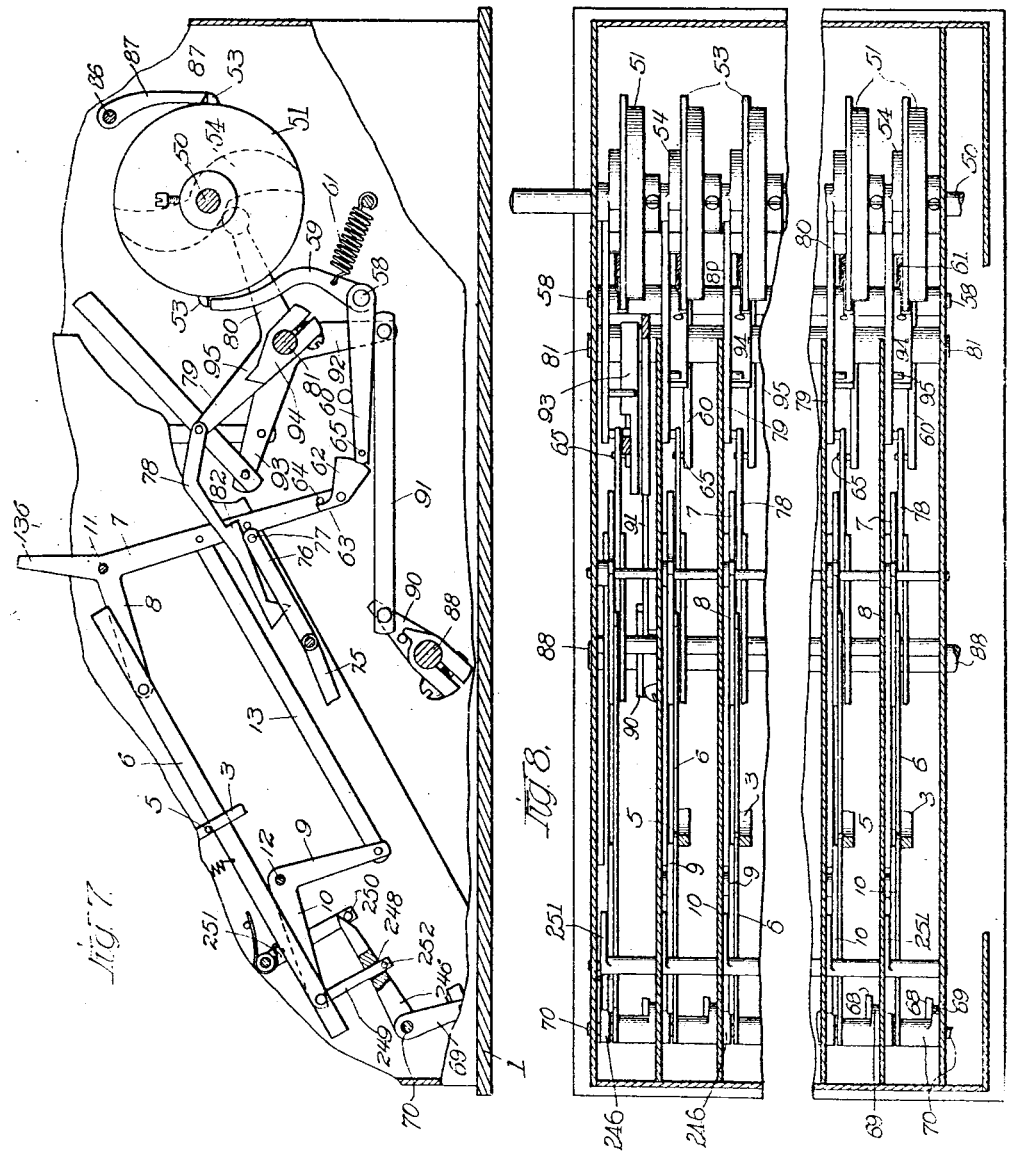
Witnesses:
Robert H. Weir
Arthur Carlson
Inventor
Daniel W. Shiek
By Hill & Hill Attys

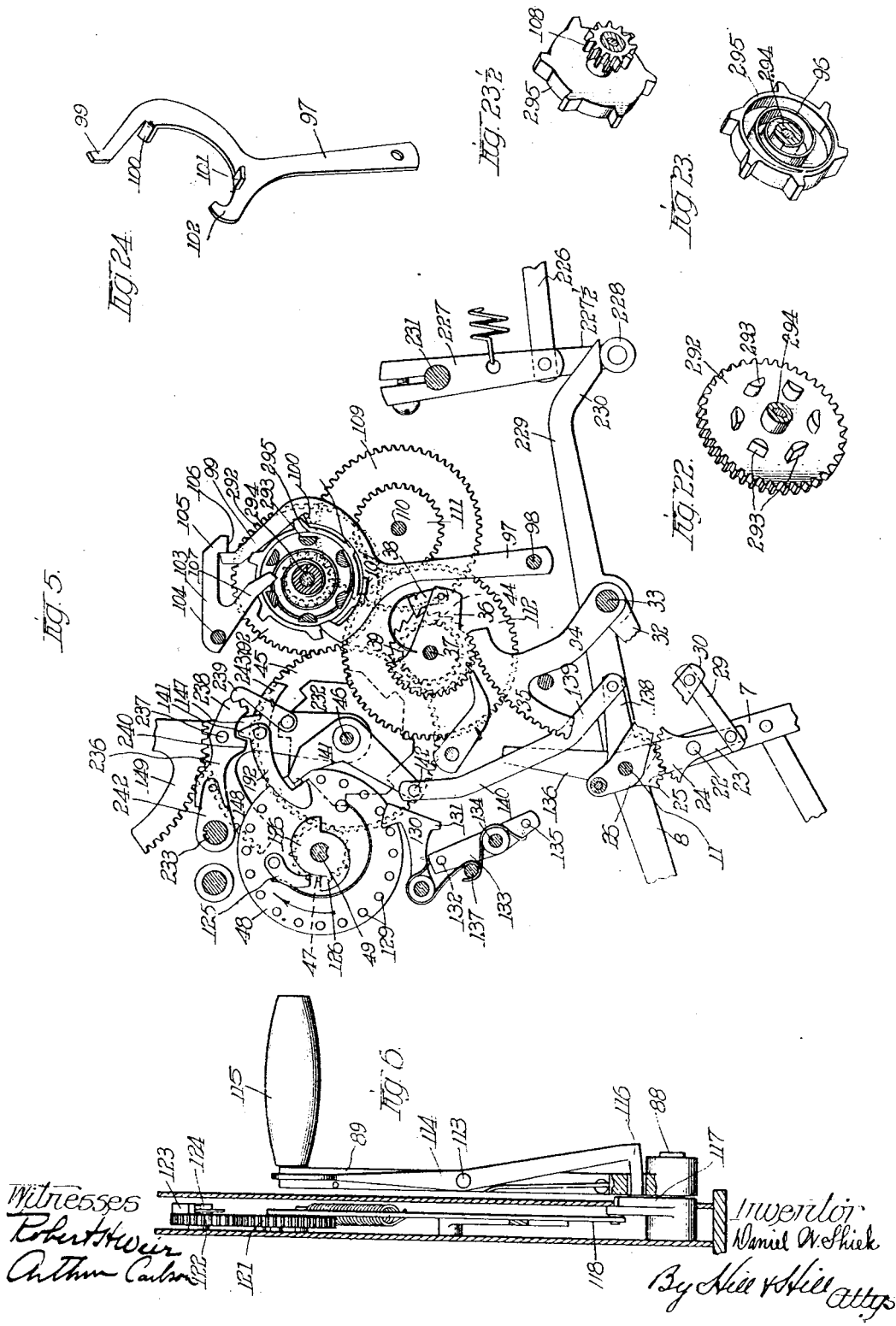
D. W. SHIEK.
COMBINED COMPUTING AND LISTING MACHINE.
APPLICATION FILED FEB. 16, 1912.
1,111,867.
Patented Sept. 29, 1914.
10 SHEETS—SHEET 5.

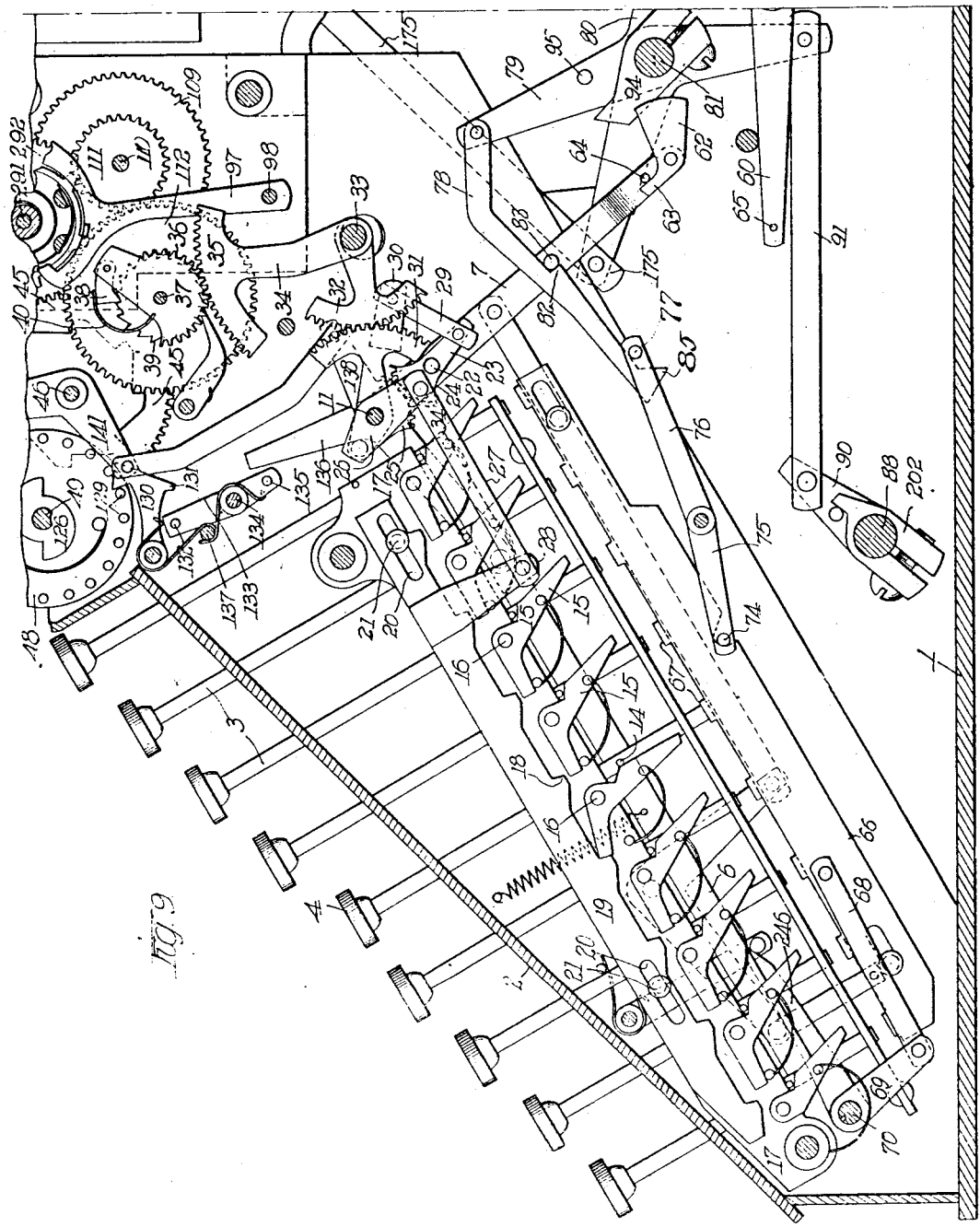

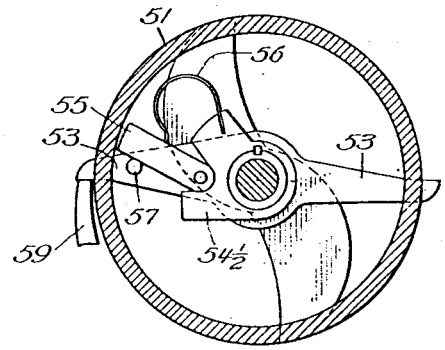
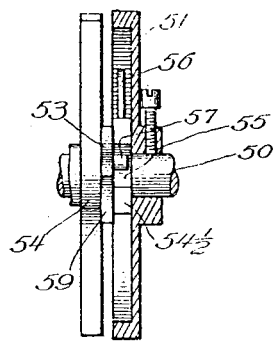
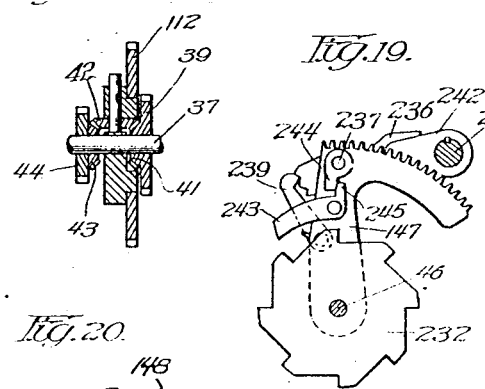
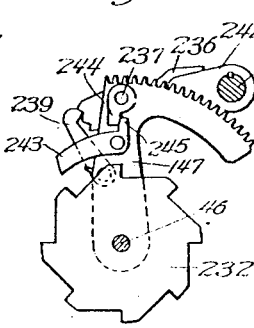
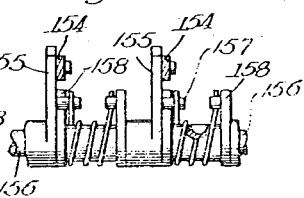
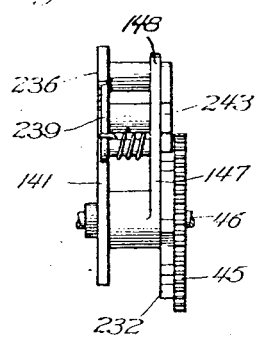
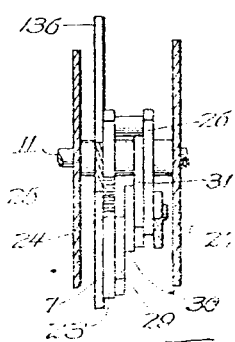

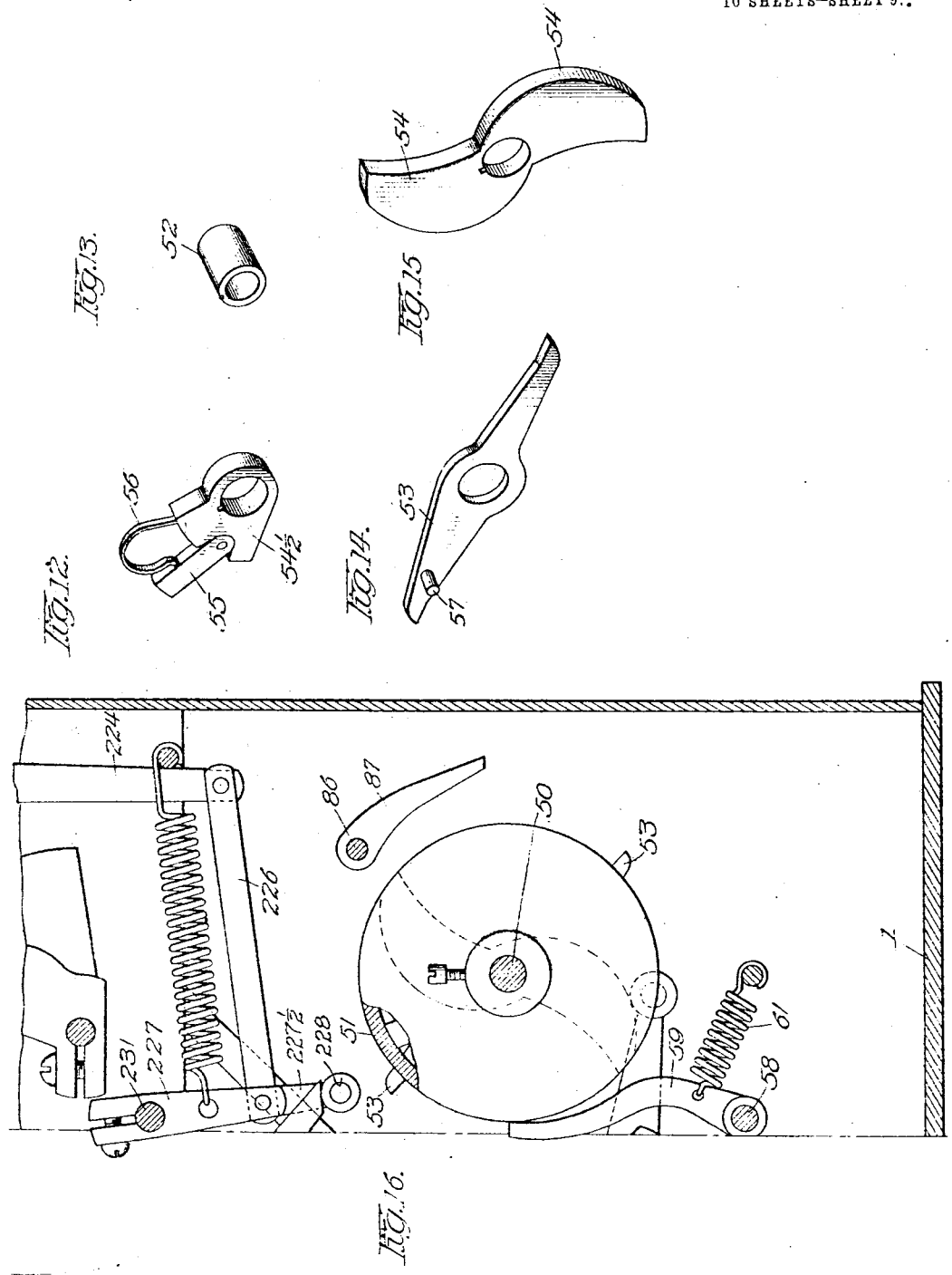

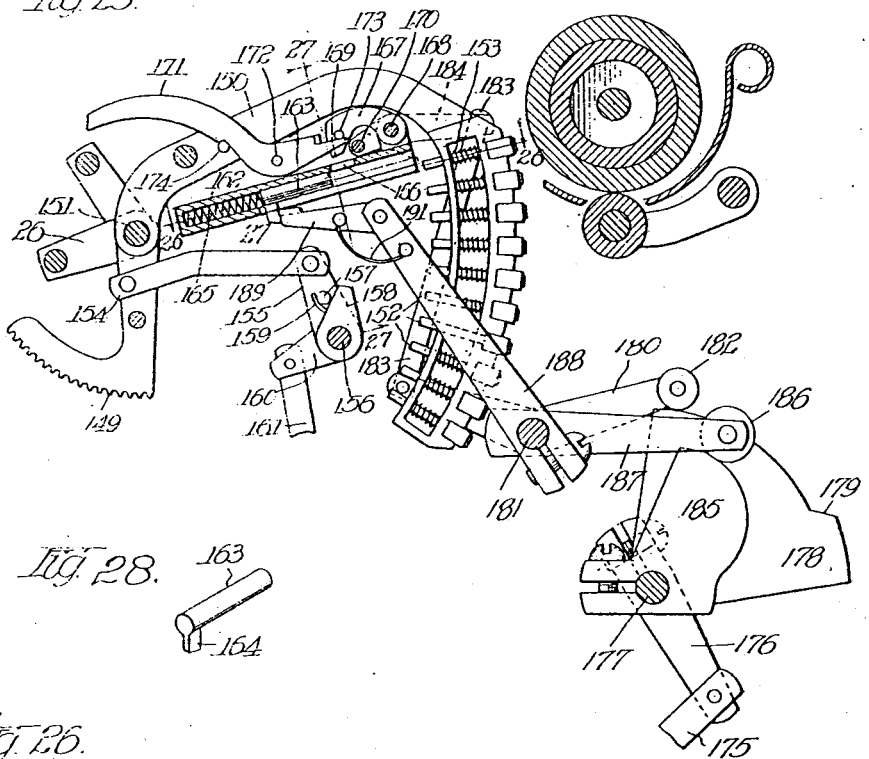

UNITED STATES PATENT OFFICE.

DANIEL W. SHIEK, OF CHICAGO, ILLINOIS, ASSIGNOR TO WALTER L. MILLIKEN, OF BARNSTABLE, MASSACHUSETTS.

COMBINED COMPUTING AND LISTING MACHINE.

1,111,867. Specification of Letters Patent. Patented Sept. 29, 1914.

Application filed February 16, 1912. Serial No. 678,068.

*To all whom it may concern:*

Be it known that I, DANIEL W. SHIEK, a citizen of the United States of America, at present residing at Chicago, in the county of Cook and State of Illinois, have invented certain new and useful Improvements in a Combined Computing and Listing Machine, of which the following is a description.

My invention belongs to that general class of devices constructed to mechanically add or carry on other computing operations, and when desired to register the result of those computations or other numbers, by suitable printing means; and in the broader sense, a class of machines or devices in which a portion of the printing may be a registration of the result of the computing operation, while other parts of the printed characters may simply be for the purpose of identifying means, common in the operation of listing, such for example, as in listing cars, in which the number of the car or cargo may be listed together with the gross weights and net weights, or such other matter as may be necessary.

My present invention is adapted for several distinct operations, which may be desirable or necessary in conducting a general business, or when employed for different lines of business. Among those special operations may be enumerated the following: First, the device is capable of being employed as a key operated computing machine only. Second, it may be employed as a key setting, and power driven computing machine only. Third, it may be employed as a key setting, lever operated, computing and listing machine. Fourth, as a key setting, power driven computing and listing machine. Fifth, as a key setting, lever operated, listing machine alone, and sixth, as a key setting, power driven listing machine alone. There are other purposes to which the machine may be put, as will appear in the general description hereafter given, but those above are deemed of sufficient importance to call for a special mention.

Figure 1:
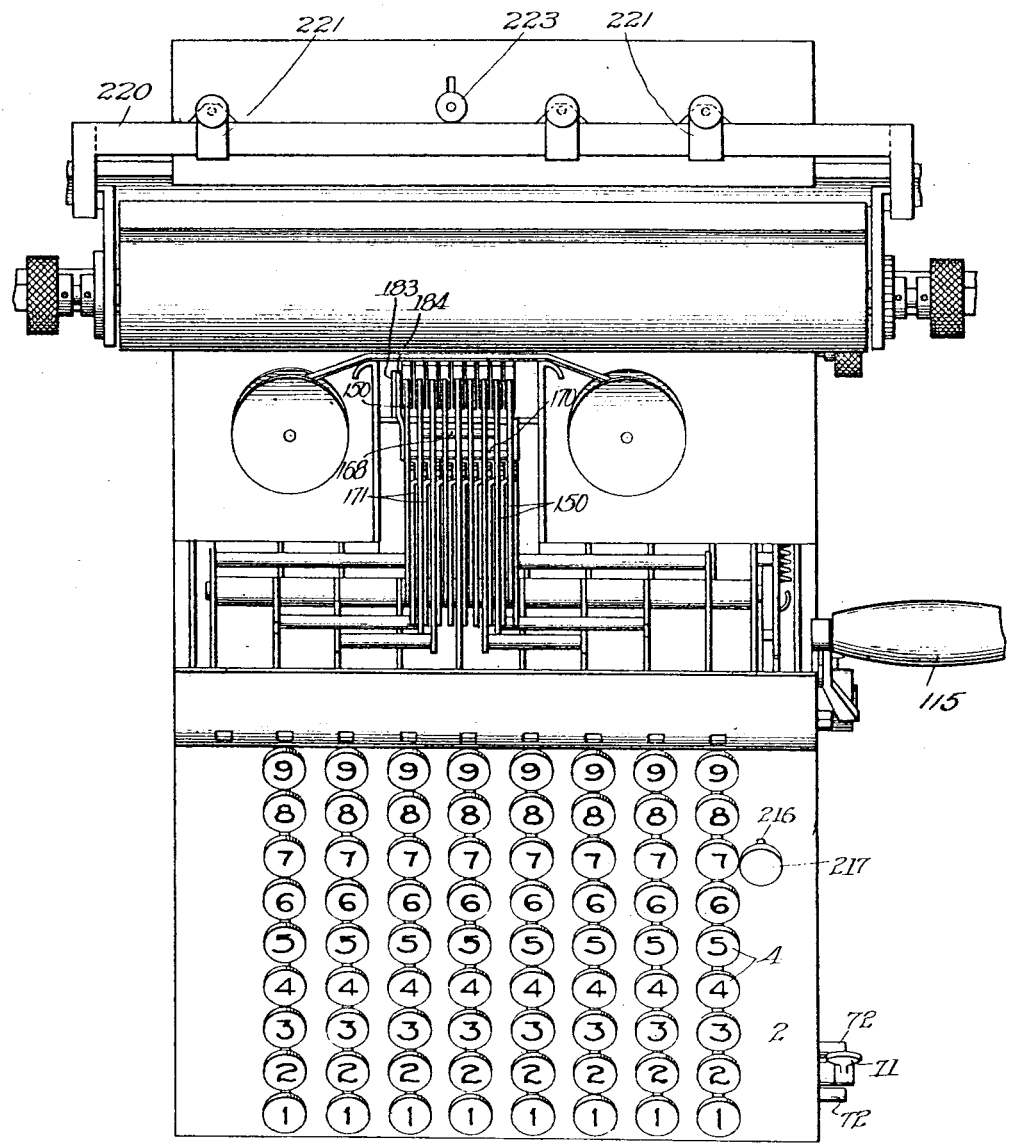
Figure 2:
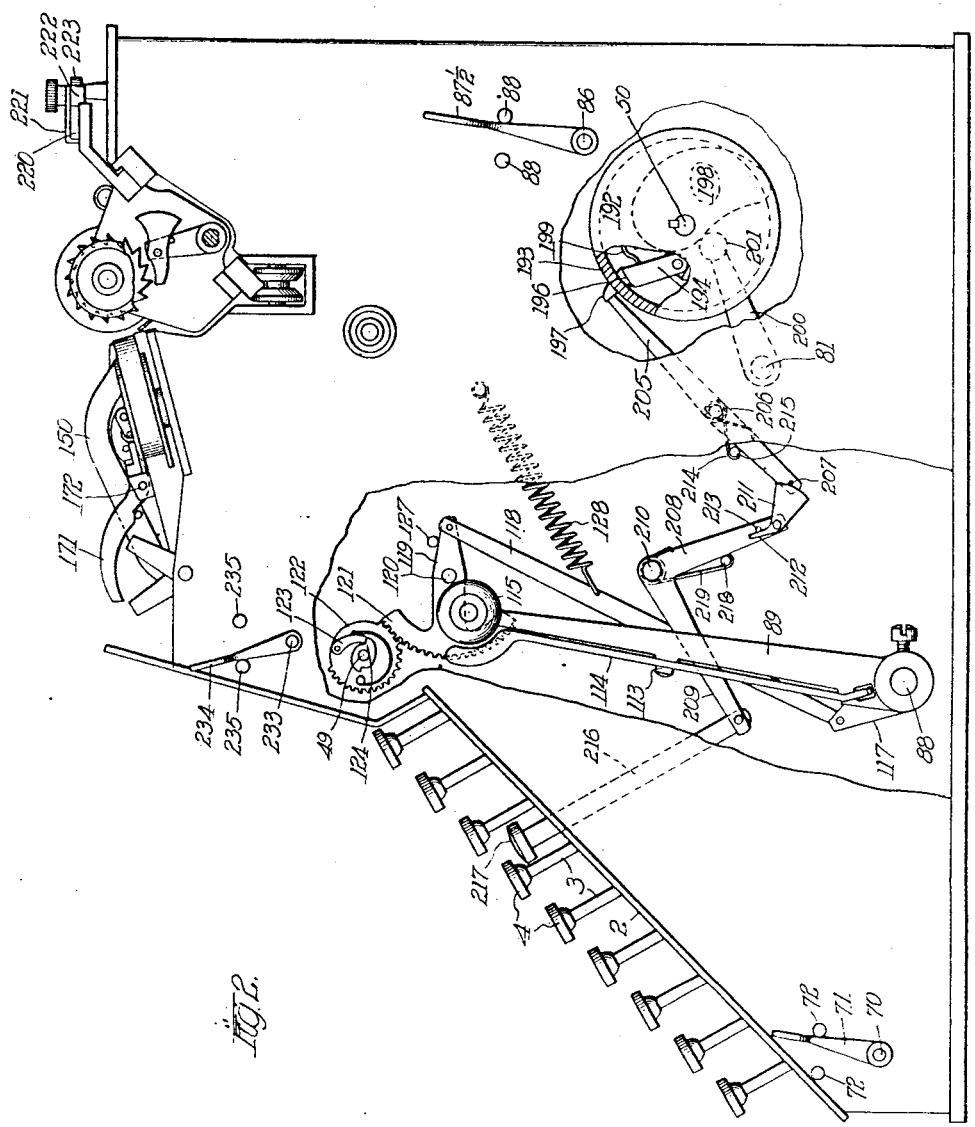
Figure 3:
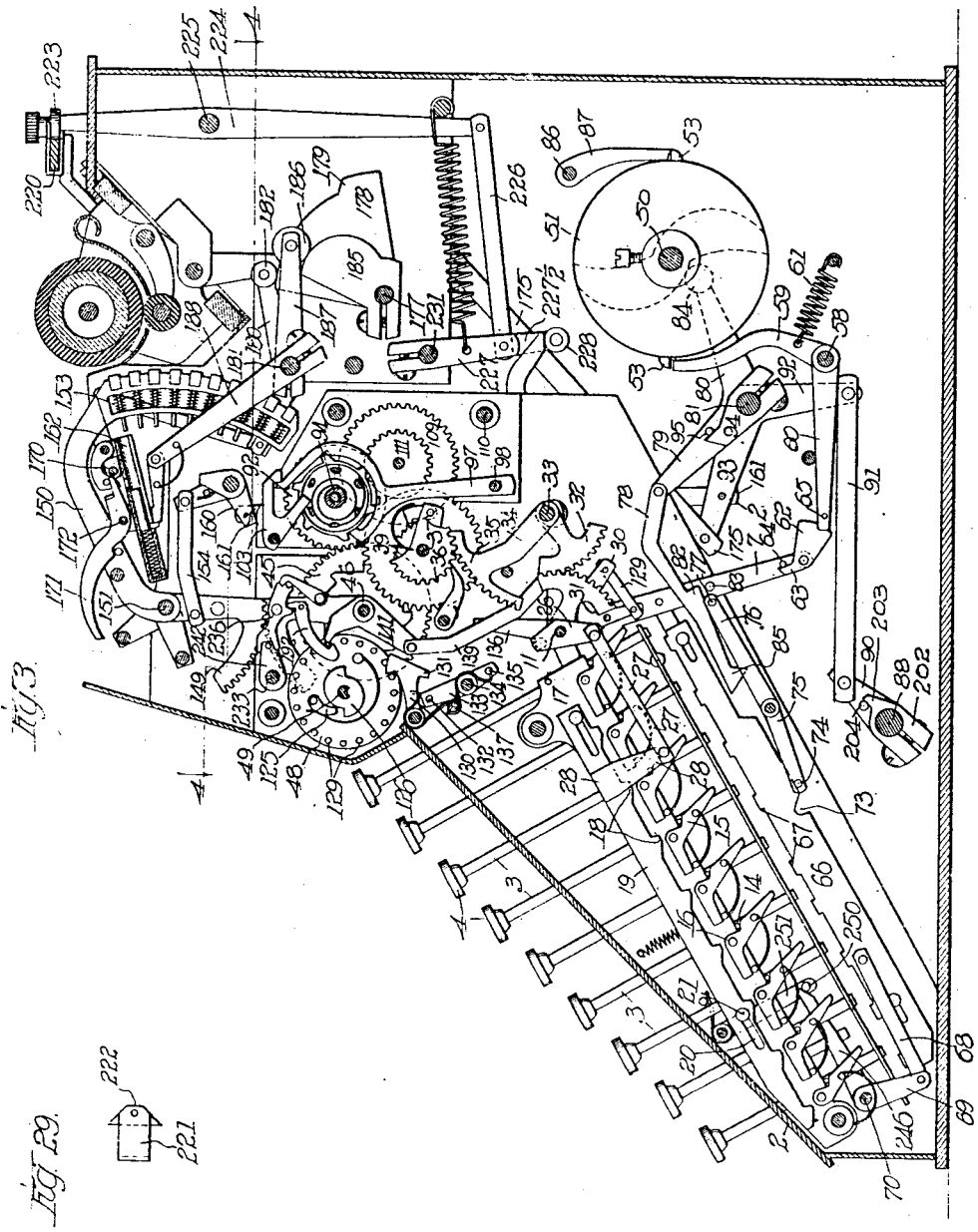
Figure 4:
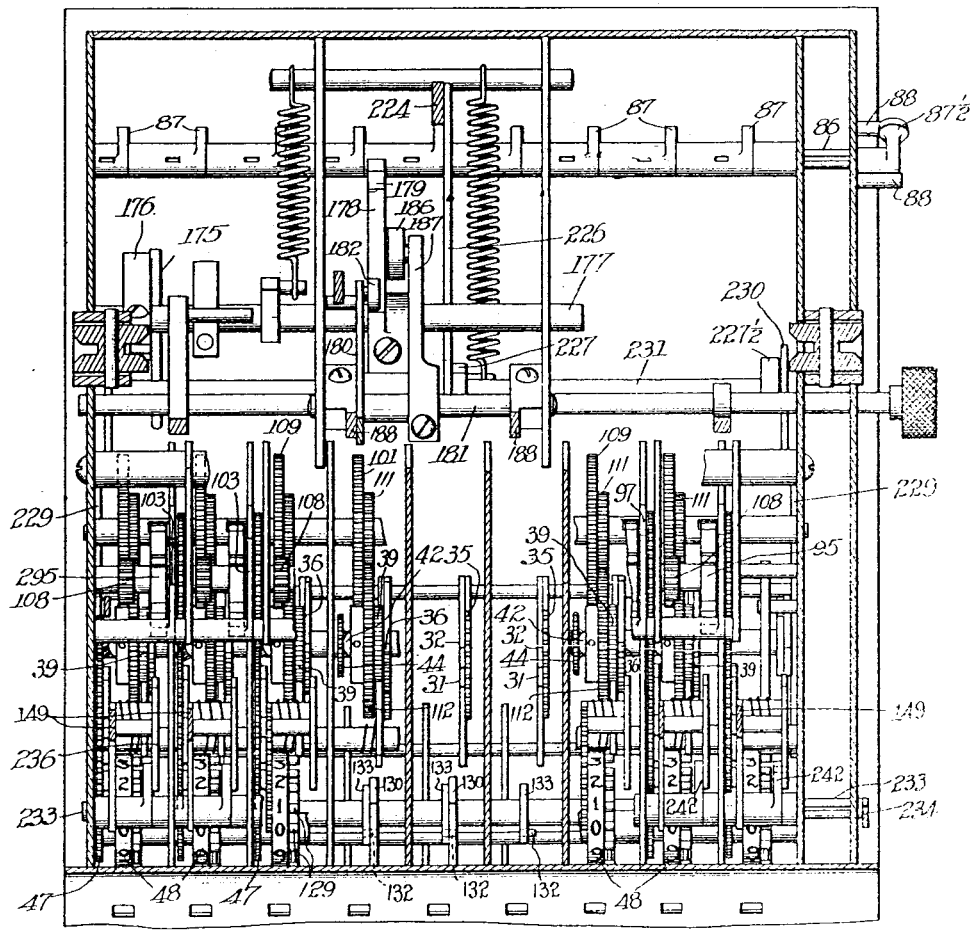

My invention consists in the novel construction, arrangement and combination of parts herein shown and described, and particularly enumerated in the claims. In the drawings, wherein like reference characters indicate like or corresponding parts, Figure 1 is a plan view of a combined computing and listing machine, embodying my invention. Fig. 2 is a side elevation of the same with parts broken away to more clearly show the construction. Fig. 3 is a longitudinal vertical section, taken on a line near the center of the machine. Fig. 4 is a sectional view taken substantially on line 4, 4 of Fig. 3, looking down upon the machine, with a portion of the parts removed to clearly show the arrangement. Fig. 5 is a partial detail view with parts removed or broken away to show the construction. Fig. 6 is a sectional view showing the operating hand lever and coöperating parts. Fig. 7 is a partial detail view, showing the driving mechanism. Fig. 8 is a partial view of the same parts shown in Fig. 7, looking downward, other parts being removed to more clearly illustrate the construction. Fig. 9 is a partial longitudinal vertical section, showing the position of the parts when a key is operated for setting up purposes. Figs. 10 to 15 inclusive are detail views of the clutch mechanism for the several series or orders of numbers indicated on the keyboard. Fig. 16 is a detail view, indicating the position of certain parts during the operation of the clutch. Figs. 17 to 21 inclusive are detail views of several different parts. Figs. 22, 23, 23½ and 24 are detail views of parts of the carrying mechanism. Fig. 25 is a side elevation, illustrating in detail, parts of the printing mechanism. Fig. 26 is a section on line 26, 26 of Fig. 25. Fig. 27 is a section on line 27, 27 of Fig. 25. Fig. 28 is a detail view of one of the piston plungers of the printing mechanism, and Fig. 29 is a detail view of the part 221.

In the preferred form illustrated in the drawings, 1 is a suitable base having mounted upon it the various parts of the machine, 2 is a keyboard of a well known form provided with a plurality of series of keys 3, each of which series of keys represents the numerals from 1 to 9 inclusive of a given order, and the various series are arranged side by side, as usual, in a position to properly arrange the different orders. Upon each of the heads 4 of the keys 3 is preferably marked a numeral indicating the number which the key represents in the operation of the machine, and upon the head may also be marked the complemental number in the well known manner. The keys are properly guided by suitable plates in their cal movement, and are each provided with suitable stops 5, or equivalent parts (Figs. 7 and 8) positioned to contact with, or otherwise arranged to operate, the bar 6, which connects the corresponding arms of the bell crank levers 7, 8 and 9, 10 respectively, pivotally mounted at the points 11 and 12. The other ends of the bell crank levers are connected by a corresponding bar 13. The keys 3 are also provided with pins, extensions or equivalent parts 14 (Figs. 3 and 9) arranged in proximity to the cam faces of the bell crank levers 15, arranged in the line of travel of the extending part 14 of the key. Said bell cranks 15 are pivotally supported at 16, on a suitably fixed part 17. One arm of the bell cranks 15 extends in the direction toward the front of the machine in a line with the stops 18 on the longitudinal movable bar 19, the stops being so positioned as to vary the longitudinal movement of the bar 19, a distance dependent upon the particular key operated. As shown, the bar 19 is suitably supported upon a fixed part of the machine by means of slots 20 and pins 21.

As best shown in Figs. 3, 5, and 9, and also shown in Fig. 21, the arm 7 of the bell crank mounted upon the shaft 11 has pivotally connected to it at 22, a lever 23 provided at its upper end with a segment 24, which segment meshes with a segment 25 pivotally mounted on the same shaft 11, and connected to and moving with a bar 26 also mounted on said shaft. A link 27 (Figs. 3 and 9) pivotally connects the arm 26 with an extension or arm 28 secured to and moving with the longitudinal movable bar 19. As most clearly shown in Figs. 3, 5 and 9, a link 29 pivotally connected to the free end of the lever 23, extends to and is pivotally connected with a swinging arm 30, also pivotally carried on the shaft 11. Connected to or integral with the swinging arm 30 is a toothed segment 31, meshing with the segment 32 pivotally mounted on a shaft 33. Connected to and moving with the segment 32 is an oscillating arm 34, carrying upon its free end a toothed segment 35, meshing with a segment or equivalent part 36 loosely mounted on a shaft 37. An extension of the segment 36, as clearly shown in Figs. 3, 5 and 9, is provided with a pivotally mounted pawl 38, maintained in operative engagement with the ratchet wheel 39 by a suitable spring 40.

Referring now to Fig. 17, it will be seen that the ratchet wheel 39 has secured thereto in some suitable manner to rotate therewith, a miter gear 41. The miter gear 41 engages the idler miter 42 in mesh with the coöperating miter 43, thereby driving the same in the reverse direction from the miter 41. Suitably connected to the miter 43 so as to rotate therewith, is a gear wheel 44. The pinion 44 is in engagement with a gear 45 (see Figs. 3, 5 and 9) mounted on a shaft 46, and said gear 45 is also in engagement with a pinion 47, secured to and operating with the registering wheel 48 mounted on the shaft 49.

As thus far explained, and referring particularly to Figs. 3, 5 and 9, in the latter of which the key of the numeral 5 is shown depressed, the pin 14 contacting with the cam on the bell crank stop 15, depresses one arm of the bell crank and elevates the other in the line of the coöperating stop 18 on the longitudinal movable bar 19, limiting the movement of said bar. The initial movement in depressing the key, as will be clearly shown in Fig. 7, depresses the bar 6 and swings the arm 7 of the bell crank mounted on the shaft 11 rearward. As the arm 7 swings rearward, it carries with it the pivot 22 thereon (Figs. 3, 5 and 9) and the lever 23 provided with the segment 24, which latter, by its engagement with the segment 25, carries the latter with it to a point limited by the permitted movement of the bar 19 by reason of its connected arm 28 and link 27, which is connected with the arm 26, and its toothed segment 25. The complemental movement from this point onward permitted to the parts, is in each case just sufficient to operate the registering wheel 48 to indicate the character representing the particular key depressed. At the moment the link 27 positively limits any further movement of the arm 26 with its connected segment 25, the further rearward movement of the bell crank arm 7 continues to carry the lever 23, pivoted at 22 on said arm 7, in a rearward direction, but the engagement of the segment 24 on said lever with the segment 25, now held firmly against movement, causes the segment 24 to ride upon the segment 25, and throws the free arm or lever 23 rearward, and by means of the link 29, oscillates the arm 30 with its connected segment 31, which latter, by its engagement with the segment 32, moves the latter the measured distance permitted, and hence moves the arm 34 with its segment 35, a measured distance, partially rotating the segment 36 and ratchet 39, and thence through the connections described, the gear wheel 44 in an opposite direction, and finally through the connections described, the registering wheel a distance measured exactly by the complemental movement, permitted to the parts after the bar 19 is positively brought to a stop by its engagement with the stop on the arm 15.

It will be understood that each order is equipped in the manner described with suitable means for carrying the 10's of one order to the next higher order, which will be hereafter described. As thus explained, it will be clear that the machine may be operated as a computing machine, if desired, and that, too, by key operation alone and without operating lever or any other power for driving the connected parts.

When it is desired to operate the device as a power driven computing machine alone, the following means, or substantially equivalent to the same, are preferably employed: Referring particularly to Figs. 3, 7, 8, 10 and 11, illustrating the preferred clutch mechanism, it will be seen that a shaft 50 extending transversely across the machine, has mounted upon it so as to rotate therewith, a plurality of cup-shaped disks 51, one of such disks for each series or order of numerals indicated on the keyboard, that is to say an independent clutch mechanism for each order. There is also loosely mounted upon said shaft 50 for each of said disks, and in proximity thereto, a sleeve or member 52, (see Figs. 12 to 15 inclusive) which has loosely mounted thereon a trip or retaining lever 53. To the sleeve 52 is secured a preferably double faced cam 54 and a hub 54¼, having pivotally mounted upon it a spring dog 55, provided with a spring 56 normally tending to press the dog outward as shown (Fig. 12). The trip lever 53 extends on either side of the disk 51 to engage the stop hereafter described, so as to release the dog from the marginal rim of the disk 51. The trip lever 53 has a pin 57 laterally extending therefrom, and so positioned as to be located beneath the dog 55, so that when the trip lever comes in contact with the stop, and is brought to rest, the further rotation of the sleeve and its associated parts will cause the dog 55 to be lifted or pressed backward, and thus released from its frictional contact with the rim of the disk 51. Upon a suitable shaft 58 is mounted a series of bell crank levers 59, 60, one for each of said disks 51, the arm 59 being extended so as to normally be in the line of travel of the extending ends of the trip lever 53. A spring 61 (Figs. 3 and 7) tends to normally retain the arm 59 in a position to engage the extending end of the trip lever as stated. The arm 7 of the bell crank lever pivoted upon the shaft 11, as heretofore described, has pivotally mounted upon its free end, a cam 62 provided with an extension 63, arranged to contact with an extending pin 64 on the said arm 7. The cam 62 is arranged to contact with an extending pin or equivalent part 65, carried near the free end of the arm 60 of the bell crank lever 59, 60, so that upon a comparatively slight movement of the arm 7, the arm 60 will be depressed and the arm 59 drawn away from the extending end of the trip lever 53, permitting the same to drop and free the dog 55, which by reason of its spring 56, is pressed outward and frictionally engages the rim of the disk 51. Below each series of keys and in line therewith, is a longitudinal movable bar 66, as shown, maintained in position by a slot and pin engagement upon a suitable part of the machine. Upon the bar 66 is formed a plurality of lateral extensions 67, one for each key of a series, so positioned that when the bar 66 is moved rearward, as shown in Fig. 9, such lateral extensions come directly beneath and slightly below the ends of the keys 3, so as to limit their movement. A link 68 (Figs. 3 and 9) connects the bar 66 with an arm 69 mounted upon a shaft 70, which, as shown in Fig. 2, has on its outer end a thumb lever 71, which is limited in its oscillation by suitable pins 72, 72, or their equivalents. On the under side of the bar 66, at a suitable point, is formed an indentation or slot 73, so arranged that as the part 66 is moved rearward, a transverse pin 74 in the end of the lever 75 is positioned in said slot or depression 73, permitting the opposite end of the lever, as at 76, to drop downward. The end 76 of the lever is provided with a laterally projecting pin 77, upon which rides a cam lever 78, pivotally mounted on one arm of the bell crank lever 79, 80, which is pivotally mounted on a shaft 81. The link or arm 78 has formed upon it a hook 82 at such point that upon the initial rearward movement of the bar 66, the hook will not engage an extending pin 83 on the arm 7. Upon the movement of any key of the series, however, as indicated in Fig. 9, the movement causes a slight rearward movement of the arm 7, so that the hook 82 engages the pin 83. At substantially the same moment, as previously explained, the cam 62 of the end of the arm 7 operates the bell crank 60, 59, releasing the trip lever 53 therefrom, and permitting the engagement of the dog 55 with the rim of the disk 51. This causes a rotation of the double cam 54, which engages a roller 84 on the bell crank arm 80, and thus draws the arm 7 and its associated parts the full limit of its movement. It will be recalled that the movement of the key operates the bell crank lever 15, serving as a stop for the longitudinal movement of the bar 19. The operation in completing the complemental movement of the various parts to operate the registering wheel 48 is thus the same as previously described when the machine was operated as a key operated machine alone, and thus the registering wheel is advanced a distance dependent upon the particular key set. As before stated, proper carrying mechanism between the different orders is provided, so that as thus described, the device constitutes a key setting and power driven computing machine only. As the parts reach their limit of movement, a cam face 85 (Fig. 9) on the end of the arm 78 contacts with the lateral pin 77 on the end of the lever 76, serving to lift the arm 78 sufficiently to disengage the hook 82 from the pin 83 on the arm 7, and as the parts assume their normal position, the arm 78 again rides upon said pin. In the rearward movement also the cam 62 on the end of the arm 7 contacts with the pin 65 near the end of the arm 60, and being free to oscillate in that direction, passes by said pin and drops substantially into the position shown in Fig. 3, ready for the next operation of the device. During this operation the cams 54 have made a half revolution, and the oppositely extending end of the trip 53 contacts with the end of the bell-crank lever 59, and stops the trip 53 in its movement, and by the momentum of the parts, positively disengages the latch or dog 55 from its frictional engagement with the rim of the disk 51, but permitting said disk to freely continue its rotation as before. Upon a shaft 86, extending transversely through the machine, is arranged a series of dogs or pawls 87 serving as stops for the extending end of the trip lever 53 on the opposite side of the disk from the arm 59. The said shaft 86 extends to the exterior of the machine, as shown in Fig. 2, and is there provided with a thumb lever 87½ limited in its movement by suitable stops or pins 88. It will therefore be apparent that in order to operate the machine as a key setting, power driven computing machine, as described, it will be necessary to move the thumb lever 71 (see Fig. 2) near the front part of the machine in order to positively move the bar 66 rearwardly, as described, and to operate the thumb lever 87½ to release the several pawls 87 and remove them out of the path of the extending ends of the trip lever 53. The free end of the pawl 87 is preferably formed with a slight cam face, so that as it is forced into position, as indicated in Fig. 3, the trip lever is forced down slightly, permitting a slight clearance between the end of the lever 59 and the opposite end of the trip lever 53 for a purpose hereafter explained.

When it is desired to operate the machine as a key setting and lever operated computing and listing machine, the following means may be employed, referring particularly to the computing operation: Upon a transverse shaft 88 is mounted the usual lever 89 (Fig. 2), and as shown in Figs. 3, 7 and 9, there is also mounted upon said shaft an arm 90. A link 91 connects the free end of said arm 90 with the end of the bell crank lever 92, 93, which is secured to and oscillates with the transverse shaft 81 heretofore mentioned. Also mounted upon said shaft and rotatable therewith, is a series of oscillating arms 94, each arranged to contact with a pin 95 on its respective arm 79 of the bell crank lever 79, 80, in a manner to force the same backward, and thus oscillate the bell crank lever 79, 80 substantially in the manner before described. It will thus be clear that if the clutches are prevented from operation by the thumb lever 87½, the bar 66 may be moved rearward as before described, when, upon setting a key, the operation of the hand lever will cause the operation of the transmitting mechanism to the registering wheels 48 substantially as before.

The carrying mechanism in the preferred form shown in the drawings may be described as follows: Referring particularly to Figs. 3, 5, 9 and 22 to 24 inclusive: Upon a shaft 291 for each of the orders except the last (where carrying will not be necessary) is mounted a gear wheel 292, meshing with the gear wheel 45 before described. Projecting from the lateral face of the gear 292 toward the next higher order is a plurality of pins, extensions, or equivalent parts 293 (Fig. 22), and also an extending hub 294, which projects within the casing of the cam member 295 (Fig. 23). A suitable spring 96 is coiled within the cam member 295 with one end secured to the projecting hub 294 of the gear wheel 292, and the other end secured to the said cam member 295, said cam member being loosely mounted upon the same shaft 291. An oscillating yoke 97 (Fig. 24) is pivotally mounted on the shaft 98. Said yoke is constructed with an extension 99 and offset shoulders 100 and 101, and also with an inwardly extending projection on the opposite side 102. A latch member 103 mounted on a shaft 104 has a hook 105, said latch member being provided with a straight face adapted at certain points of the operation to rest upon the top of the extension 99 of the yoke, and at others to have the hook engage said extension to prevent the movement of the yoke. The latch member 103 also has an extending arm 107, which is arranged within the path of the travel of the projecting pins 293. Secured to the cam member 295 in a direction toward the next higher order, is a pinion 108 (Fig. 23½), which meshes with the pinion 109 mounted upon a shaft 110, and having secured thereto another pinion 111, which meshes with a gear wheel 112 (see Fig. 17) mounted upon the shaft 37, and serving as a support for the miter wheel 42, as shown. The forward movement of the gear wheel 112 carries forward the miter gear 42 and associated parts, including the gear wheel 44, and thus advances the registering wheel 48 in the manner heretofore described. The operation is as follows: The rotation of the gear wheel 45 heretofore described serves to rotate the gear wheel 292. The rotation of the hub 294 of the said gear wheel serves to tension the spring 96 in the cam member of the next higher order, said cam member being held against movement by the offset 100 of the yoke 97, which is locked against movement by the latch 103. As the gear wheel 292 moves forward, one of the projecting pins 293 contacts with the extension 107 on said latch member, gradually raising the same from the extension 99 on the yoke, and bringing forward another of said projections 293 in line with the extension 102 of said yoke. The parts are so proportioned and timed that just before a full cycle of the lower order is completed, and it becomes necessary to carry to the next higher order, the latch 103 is raised so as to release the extension 99 on the yoke from the hook 105 of the latch, permitting the yoke under the resilient action of the cam member 295 to slightly swing away from said cam member. The complete movement, however, of the yoke is prevented by reason of the fact that the end of the extension 102 comes in contact with, and is retarded by the proximate pin 293, thus permitting the flat face 106 of the latch member to rest upon the top of the extension 99. As the cycle is fully completed the pins 293 passes by the projection 102, releasing the yoke, and the resilient forward movement of the projecting tooth on the cam member upon the projection 100 of the yoke presses the yoke away from it, while the tension spring causes the cam member to quickly move forward. One of the projecting teeth of the cam member, however, in advance of that which has just been in contact with the extension 100, contacts with the extension 101 on the yoke and forces the yoke into the opposite direction, to a point where the latch 103 again engages the extension 99 on the yoke, at which point the tooth is released from the extension 101, and the parts are ready for the next action. The slight forward movement of the cam member 295 carries forward with it the gear 108 attached thereto, the gear wheel 109, the gear wheel 111 attached to said latter gear wheel, and the gear wheel 112, and hence the pinion 44, and as heretofore described, the various associated parts of the next higher order advance the registering wheel one point to indicate that one is carried from the next lower order.

It is obvious that in the first order there will be no necessity for a cam member 295, since there is nothing to be carried to the lower order, and in the highest order there will be no necessity of a gear wheel 292, as there will be no higher order to be carried to; otherwise the construction just described is provided for each order shown on the keyboard.

Suitable means are employed to reset the registering wheels, or members, or cancel the computation represented thereon. As illustrated in the drawings, the hand lever 89 mounted on the shaft 88, more clearly shown in Figs. 2 and 6, has pivotally mounted thereon at 113, a lever 114, having the upper end extended to form a thumb piece in proximity to the handle 115 of said lever 89, and the lower end provided with a transversely extending projection 116. As the top of the thumb lever 114 is moved to the right (Fig. 6), the extending end 116 moves into engagement with an arm 117, which is carried on a sleeve loosely mounted on the shaft 88, and the forward movement of the hand lever will serve to carry said arm forward, together with its connected parts. A link 118 extends from the end of the arm 117 to the free arm of a lever 119, pivoted on a stud or post 120, and provided at its opposite end with a toothed segment 121, which, in turn, meshes with a pinion 122 loosely mounted on the shaft 49, which carries the several registering wheels or members 48. A pawl 123 is carried upon said pinion 122 and arranged to engage with a ratchet 124, secured to the end of the shaft 49. Each of the registering wheels 48 has mounted upon it a suitable pawl 125 arranged to engage with a ratchet 126 in proximity thereto, which ratchet is secured to the shaft 49. It will be seen from this description that upon grasping the handle 115 on the lever 89, and at the same time with the thumb moving the top of the lever 114 to the right, as shown in Fig. 6, the extension 116 will engage the arm 117, and the forward movement of the lever will oscillate the lever 119 with its toothed segment 121 and the loose pinion 122, the pawl 123 loosely passing back over the ratchet 124. As the handle is released, however, and the reverse action begins, the pawl 123 engages the ratchet 124, rotating the shaft 49 a fixed distance sufficient to cancel the computation on the machine, or clear the same. As shown, the ratchet 124 is provided with two shoulders for engagement with the pawl. This is occasioned by reason of the fact that the registering wheels shown are double, or carry upon their faces the numbers 0 to 9 twice. If the registering wheel only carried those numbers once, the ratchet would require but one shoulder. By this action the registering wheels are all brought into alinement with each other to display the characters naught or zero. The operation just described, or that required to move all the registering wheels to a position where the zero characters only will be displayed, will hereafter be referred to as " clearing the machine," which is a term frequently employed in this connection, and is readily understood by those familiar with the art. Any suitable projecting pin, or equivalent part 127, serves to limit the oscillation of the lever 119 in that direction, to bring the registering wheels exactly into the position described, while a suitable spring 128 attached to the link 118 aids in the return of all the parts to their normal positions.

To prevent any tendency to overthrow, that is by the violent manipulation of the keys or otherwise, which might tend to carry the registering wheels by the proper point by the momentum, suitable means are provided, which, in the preferred form shown in the drawings, are clearly illustrated in Figs. 3, 5 and 9. As shown, each registering wheel 48 is provided with projecting pins 129 extending laterally from the face thereof, corresponding in number with the number or characters on the face of the wheel, and spaced from one another to correspond with the distance between said numbers. A cam faced resiliently mounted pawl 130 in normal position, is adapted to extend between two adjacent pins 129 in such a manner that as the registering wheel is rotated in the direction indicated by the arrow, the rearward pin 129 engaging the face of the cam on the pawl 130, presses the same backward against the action of the spring, permitting the pin to pass by the pawl, which immediately springs into place between the said pin and the next succeeding one. The pawl is provided with an inclined face, terminating in the extension 131, constructed to cooperate with a pin 132, carried on a lever 133, pivotally mounted on a shaft 134. The other end of the lever 133 is provided with an extension or pin 135, arranged in the path of the extension 136 (Fig. 7) on the bell crank lever 7, 8, heretofore described. Upon the operation of the device, whether as key operated, power driven, or lever operated, so as to oscillate the bell crank lever 7 and 8, as heretofore described, and through the coöperation of the various parts described to move the registering wheels 48 a distance determined by the particular key operated, as the bell crank lever 7, 8 reaches its limit of movement and hence the registering wheel 48 has reached the proper point to indicate the character of the key operated, the oscillating arm 136 on the bell crank lever 7, 8 contacts with the pin 135 on the lever 133, pressing the end forward when the pin or projection 132 on the opposite end engages the under side of the pawl 130, forcing the same firmly into position, and instantly preventing any further movement or overthrow of the registering wheels. The reverse movement of the parts releases the lever 133 from the influence of the extension 136, when a suitable spring will draw the end of the lever 133 back against the shaft 137, thus relieving the pawl 130 from engagement therewith, and leaving the same free to operate as before described.

Supplementing what has been previously said in reference to the bar 66, it may be mentioned that when the bar 66 and its coöperating parts are moved into the positions shown in Fig. 9, the functions of the keys cease to be an operating element, and the keys then become merely a part of the setting up or controlling means, the protections 67 on the bar 66 permitting a sufficient downward movement of the keys for that purpose.

Any preferred mechanism may be employed to transmit the movement resulting from the operation of the keys, as heretofore described, to the printing mechanism to control and operate the same. In the preferred form shown in the drawings, as best shown in Figs. 3, 5 and 9, and first drawing attention to Fig. 5, an arm or lever 138 is formed integral with, or so connected as to oscillate with the arm 26 and toothed segment 25 mounted upon the shaft 11. The free end of the arm 138 is pivotally connected to a link 139, having its opposite end pivotally connected to the bell crank lever 141, which is loosely mounted on the shaft 46. Also loosely mounted upon the shaft 46 (Figs. 19 and 20) is an arm 147 provided with a toothed segment 148, which toothed segment meshes with the toothed segment 149 (see Fig. 25) mounted on or connected to the end of a curved bar or lever 150, which is loosely supported on a shaft 151. There is one of these bars 150, constituting type carrying bars, for each order shown on the keyboard. The type carrying bars 150 are downwardly curved in the form of a segment of a circle, as clearly shown in the several figures (Figs. 3 and 25) and is provided with a number of longitudinally movable pistons or plungers 152, upon the outer ends of which are formed the characters represented upon the keyboard from 0 to 9 inclusive. Suitable springs 153 are provided to hold the pistons in a retracted position free from contact with the face of the platen. A link 154 connected to the type carrying bar 150 between the segment 149 and the shaft 151 connects said bar with the end of an arm 155 (Fig. 18) loosely mounted on a shaft 156. The arm 155, in the preferred form, has a laterally projecting pin 157, arranged in the path of the oscillating arm 158, which is secured to the shaft 156. A spring 159 contacting with said pin and connected to said arm, serves to return the parts to normal position when they are released for that purpose. The construction just described is supplied one for each of the orders indicated on the keyboard, the number of type carrying bars corresponding with the number of orders. Upon the outer end of the shaft 156 is secured an arm 160 (see Fig. 25), having pivotally connected to its free end a link 161, which link extends to, and at its other end is connected to the arm 93 of the bell crank lever 92, 93 (see Fig. 3). For each type carrying bar means are provided to operate the type bars. As most clearly shown in Figs.

and freeing the plungers from their restraint when said plungers are simultaneously driven forward under the impulse of the retracted springs 165 striking upon the inner end of the type bar 152 in line therewith. Upon the return of the various parts to their normal positions, due to the influence of various springs properly connected to the various levers and other parts, the parts just described operate in the reverse direction and resume their normal positions substantially as shown in Figs. 3 and 2b.

From the description given it will be seen that the initial movement upon depressing a key, as previously described, swings the arm 26 with the toothed segment 25 mounted on the shaft 11, forward a distance dependent upon the particular key operated. This same movement oscillates arm 138, which is connected to said arm and segment, a corresponding distance, and longitudinally moves the link 139 a measured distance, and oscillates the bell crank 141. As previously described, the toothed segment 149 is pulled inward by the link 154 by reason of the resilient connection of the arm 155 with the arm 158. As said toothed segment 149 is drawn to the right, as indicated in Figs. 3, 5 and 9, its engagement with the segment 148 causes it also to move to the right, until a pawl 192 carried on the arm of said segment engages the free end of the bell crank lever 141. This measures and positively limits the oscillation of the type carrying bar 150, and the type bar corresponding with the key operated is brought into alinement between the end of the cylinder 162 and the platen in a position to be struck by the plunger 163 when released, as heretofore described. It will be seen, as thus described, that the initial movement of the keys serves to set the type in position for printing, while the complemental movement of the keys measures the distance the registering wheels shall be rotated to indicate the key operated.

Means are provided to drive the printing mechanism by a suitable clutch device, keyed or otherwise secured to the outer end of the shaft 50. Referring particularly to Fig. 2, a clutch mechanism in the preferred form, following in its general plan the clutch mechanism heretofore described for each order, is shown. As shown in the drawings, a disk or shell 192 is provided with a projecting flange or rim 193. A dog or latch 194 is pivotally supported upon a member at a point off the center of the disk, with a shoulder 196, adapted when the dog is pressed outward to firmly engage or cramp upon the rim 193. The dog is provided with an extension 197, extending outside of the rim and adapted to engage a suitable stop. Within the disk is loosely mounted on a shaft, a body or member which is provided with a single cam in this instance, 198, upon which body is pivotally supported the dog 195 described. Whenever the dog 195 is released from the stop, a suitable spring 199 presses the same outward, causing the end to cramp against the rim 193, firmly locking the body within the shell to the latter, and rotating the cam 198. An arm or lever 200 keyed or otherwise secured upon the shaft 81 heretofore described, has a roller 201 arranged to ride upon the cam 198, so that as the latter is rotated, the arm is oscillated, serving to rock the shaft 81 together with the bell crank levers 92, 93, and associated parts secured to said shaft 81 (see Fig. 3). This action will also tend, by reason of the connection of the arm 92 on the bell crank with the link 91 on the arm 90 on the shaft 88, to oscillate the hand lever on said shaft, unless provision is made to prevent it. Such oscillation of the hand lever, under the circumstances, is not desirable, and as one simple means of preventing it, I secure the lever to a block 202 (Fig. 3) which is firmly secured on the shaft 88, and is provided with an extension 203, adapted to engage with the pin 204 on the arm 90 when the lever is swung forward. By this arrangement it will be seen when it is desired to swing the lever forward, it is through the intermediate connection described, connected with the arm 90, so as to oscillate the same and the associated parts, while on the other hand when the clutch mechanism just described serves to drive the device, the lever will remain at rest, the arm 90, however, being oscillated, but as each forward movement of the same, the pin 204 will move away from extension 203 without moving the hand lever.

Means are provided to control the action of the clutch device described, and this, in the preferred construction shown, consists of a lever stop 205, pivoted upon a stud 206, with one end extending into the path of the extension 197 on the dog of the clutch, as shown, and with the other end extending in the opposite direction from the pivotal support, and provided with an offset extension or pin 207. A bell crank lever 208, 209, pivotally supported at 210, is provided on the end of the arm 208 with a pivotally supported cam 211, provided with an extension 212, arranged to engage with a pin 213 on said arm as it moves in that direction. As the bell crank is oscillated or moved, the cam 211 engages the pin 207, and presses that end of the level 205 downward, releasing the opposite end from contact with the extension 197, and permitting the dog to engage the rim 193. The reverse movement of the bell crank permits the cam 211 to rock on its pivot, and pass by the pin 207 without affecting the lever 205. As soon as the cam 211 passes the pin 207, a suitable spring 214, or equivalent means, causes the lever to resume its original position with the end extended in the path of the extension 197 on the dog, thus permitting the cam 198 to make a single revolution. A stop 215 may be employed to limit the movement of the lever and positively position it exactly as desired. A pin or bar 216 is secured upon the end of the arm 209 on the bell crank, and extends to the exterior of the keyboard and provided with a head 217, which may be suitably lettered to indicate its use. A pin 218 serves to limit the backward swing of the arm 208 of the bell crank, while a spring 219 serves to draw back said arm at the end of each operation ready for the next.

When it is desired to print without adding, for example as in listing, or when it is desirable to add on certain columns and list on certain other columns, means may be provided to disconnect the adding or computing mechanism to permit the printing mechanism to operate alone. In the preferred form shown in the drawings, the transversely movable paper carriage is provided with a bar or equivalent part 220, having adjustably mounted thereon one or more tripping dogs 221 provided with cam faces 222 (Fig. 29) which, as the carriage is transversely moved, contact with the roller 223 (Figs. 1 and 3) mounted on a lever 224, pivotally supported on a shaft 225. The opposite end of the lever 224 is connected to a link 226, also clearly shown in Figs. 4, 5 and 16, which link is connected to the end of a swinging arm 227, firmly secured to a rock shaft 231. Near the outer ends of said rock shaft 231, and near the outer sides of the machine, are firmly fixed to said shaft, depending arms 227½, one on either side and provided on their free ends with rollers 228. Coöperating with said oscillating arms and the rollers 228 are provided two arms or bars 229, pivotally mounted at one end upon the shaft 11, and supporting at a point between the ends, the transverse shaft 33, which carries thereon the several arms 34, provided with segments 35, one for each order. As thus constructed, it will be seen that the two bars 229, arranged near the outside of the machine, and pivotally mounted at one end upon the shaft 11, and connected between the ends by the shaft 33, from substantially a rectangular frame, so that when the lever 224 is operated, the arms 227½ swing toward the front part of the machine, the rollers 228 thereon approaching the inclined face 230 on said parts 229, permitting the free end of said arms to drop, carrying the shaft 33 and the connected parts therewith. By this operation the several segments 35 are disconnected from the coöperating parts, thus preventing the operation of the adding mechanism, but permitting the free operation of the printing mechanism. Whenever the carriage is moved to a position to free the roller 223 from the cam face 221, the lever 224 and the coöperating parts are returned to their normal position by suitable springs or equivalent parts, connected to the main arm 227 and to a fixed part of the machine, tending to draw the several parts back to the normal position described.

The operation heretofore described refers to the printing of items as set up one by one on the keyboard. For the purpose of printing totals, that is the total amount resulting from the several operations on the keyboard, and as heretofore described when computing, suitable means may be provided, which, in the preferred form shown, is as follows:—Referring particularly to Figs. 3, 5, 15 and 20: Connected to the rear wheel 45 is a ratchet wheel 232, provided with shoulders corresponding in position and practice with the arrangement of the characters shown upon the face of the registering wheels 48. A transverse rock shaft 233, also shown in Fig. 2, is provided with a thumb lever 234 secured thereto to rock said shaft, and limited in its swing by suitable stops 235. A bifurcated lever 236 (Figs. 3 and 5) mounted on a stud 237, extending from the arm 147 heretofore described, has formed upon its opposite end two or more notches, or equivalent parts, 238. A spring dog 239 also pivotally mounted on the arm 147, has its end formed to coöperate with the indentations or notches 238 on the end of the bifurcated lever 236. An extending shoulder 240 on said bifurcated lever 236 extends in the path of an extension 241 on the pawl 192 heretofore described, so that as the rock shaft 233 is turned to the right, the extending arm 242 thereon engages the forked end of the bifurcated lever 236, swinging the same downward and lifting the opposite end, so that the pawl 239 engages a notch at a lower point thereon. This action brings the shoulder 240 in contact with the extension 241 on the dog 192, swinging the free end of the same upward to clear the end of the bell crank lever 141. At the same time a pawl 243 drops upon the face of the ratchet wheel 232. The said ratchet wheel is so positioned and timed with relation to the registering wheels 48 as to space the proximate shoulder from the end of the pawl 243 of such distance that as the arm 147, and its associated parts, including the pawl 243, is moved backward or to the right, as shown in Fig. 5, the distance traveled by the end of said pawl 243 to the proximate shoulder on the ratchet wheel, will set the appropriate and associated type bar at the proper point to print the character represented upon the face of the registering wheel. When the rocking shaft 233 is thus operated in the manner and for the purpose stated, the total may be printed by either operating the hand lever 89 or the push pin 216 to throw the main clutch into operation, as before described. To clear the machine, however, it is necessary, as shown in this machine, to operate the hand lever as heretofore described. As clearly shown in Fig. 19, the engagement of the dog or pawl 243 with the ratchet 232 in the manner described is permitted by reason of an extending arm 244 fixed upon the shaft 237, arranged in the path of an extension 245 on said pawl 243. When the bifurcated lever is in the position shown in Fig. 19, the end of the pawl 243 is lifted clear of the ratchet wheel 232, and as shown in Fig. 3, the latch 192 is in position. When, however, the thumb lever on the shaft 233 is operated to rock said shaft, the lever 236 is operated, rocking the shaft 237, upon which the arm 244 is mounted, swinging the free end of said arm 244 to the left, as shown in Fig. 19, and permitting the free end of the pawl or dog 243 to drop into operative position upon the face of the ratchet 232.

It is desirable, in devices of this kind, that some effective means be provided, so that a key upon the keyboard may not be partially depressed and then released without completing its stroke. Such partial operation tends to disorganize the arrangement and prevent the accuracy of the operation of the registering wheels. Means may be employed for this purpose, that shown in the drawings (Fig. 7) being preferred. As here shown, a bar 246 loosely supported upon the shaft 70 is provided for each order on the keyboard. Said bars are provided between the ends with a suitable aperture 248, through which loosely passes a pin or bar 249, firmly secured to the bar 6, which, by the operation of the key, is depressed. The comparative sizes of the said bar 249 and the slot or opening through the arm 246 are such that the bar freely passes through said opening, when said arm is held in a suitable position, as indicated in Fig. 7. Any material change, however, in the position will cause the bar to cramp in said opening and be locked against further action until the opening is brought into proper alinement with the direction that the bar moves. The free end of the lever 246 is formed with inclined faces and arranged to coöperate with a pin 250 on the end of a swinging bar 251. As shown in said Fig. 7, when the bar 6 is depressed by a key, the depending bar 249, snugly fitting the opening 248, loosely passes through the same. Any tendency, however, to move the bar 249 in the opposite direction, as would be the case if the key were partly depressed and then released, causes the bar 249 to cramp in the slot 248, and is thus prevented. When the bar 249 nearly reaches its limit of downward action, an extending part either on said bar or on the associated parts, contacts with the upper face of the bar 246 and presses the same downward, the inclined face of the end thereof forcing the pin 250 on the swinging arm 251 away to permit such action. A laterally projecting pin 252 on the free end of the bar 249 beneath the arm 246 causes the said arm in its upward movement, which is permitted by the upper inclined face coming in contact with said pin 250, bringing the parts into proper alinement, near the limit of the movement to engage the underside of said bar 246, and reversing the action, force the inclined face against the pin 250, swinging the arm 251 away and permitting the end of the bar to pass above said pin, as shown in said figure. By this simple means it is necessary in each case, after a key is initially moved so as to operate any of the parts, to complete the full stroke of the key, thus giving the operator notice of the error, if an error has been committed, and to properly correct the same.

The ribbon, the carriers therefor and the means for operating the same, together with the carriage, and various other parts, may be modified as desired, and as I claim nothing upon the same in this application, they require no description.

Having thus described my invention, it is obvious that various immaterial modifications may be made in the same without departing from the spirit of my invention, hence I do not wish to be understood as limiting myself to the exact form, construction, arrangement, or combination of parts herein shown and described, or uses mentioned.

What I claim as new and desire to secure by Letters Patent is:—

1. In a computing machine, a plurality of indicators, a series of operating keys for each indicator, and intermediate transmitting mechanism between the operating keys and the indicators, whereby the latter may be actuated by the operation of the former, in combination with supplemental operating mechanism arranged to coöperate with the transmitting mechanism to actuate the indicators.

2. In a computing machine, a plurality of registering members, a series of operating keys for each registering member, and intermediate transmitting mechanism between the operating keys and the registering members whereby the latter may be actuated by the operation of the former, in combination with supplemental operating mechanism arranged to coöperate with the transmitting mechanism to actuate the registering members.

3. In a computing machine, a plurality of registering members, suitable carrying mechanism, a series of operating keys for each registering member, and intermediate transmitting mechanism between the operating keys and the registering members whereby the latter may be actuated by the operation of the former, in combination with supplemental operating mechanism arranged to coöperate with the transmitting mechanism to actuate the registering members.

4. In a computing machine, a plurality of registering wheels, a series of operating keys for each registering wheel, and intermediate transmitting mechanism between the operating keys and the registering wheels, whereby the latter may be actuated by the operation of the former, in combination with supplemental operating mechanism arranged to coöperate with the transmitting mechanism to actuate the registering wheels a distance dependent upon the particular key operated.

5. In a computing machine or the like, a plurality of indicators, a series of operating keys for each indicator, and intermediate transmitting mechanism between the operating keys and the indicators, whereby the latter may be actuated by the operation of the former, in combination with means for limiting the function of the keys to that of controlling elements only.

6. In a computing machine or the like and in combination, a plurality of indicators, a series of operating keys for each registering indicator, intermediate transmitting mechanism between the operating keys and the indicators, whereby the latter may be actuated by the operation of the former, and means for limiting the function of the keys as an operating element to that of a controlling element only.

7. In a computing machine or the like and in combination, a plurality of indicators, suitable carrying mechanism, a series of operating keys for each registering indicator, intermediate transmitting mechanism between the operating keys and the indicators, whereby the latter may be actuated by the operation of the former, and means for limiting the function of the keys as an operating element to that of a controlling element only.

8. In a computing machine or the like, the combination of a plurality of registering wheels, a series of operating keys for each registering wheel, intermediate transmitting mechanism between said keys and registering wheels, whereby the wheels may be actuated by the operation of the former, and means operable at will for limiting the function of the keys as an operating element to that of a controlling element only.

9. In a computing machine or the like, the combination of a plurality of registering wheels, suitable carrying mechanism, a series of operating keys for each registering wheel, intermediate transmitting mechanism between said keys and registering wheels, whereby the wheels may be actuated by the operation of the former, and means operable at will for limiting the function of the keys as an operating element to that of a controlling element only.

10. In a computing machine or the like, a plurality of indicators, an individual clutch mechanism for each indicator, intermediate transmitting mechanism between the clutch mechanism and the registering indicator, whereby the latter may be actuated by the operation of the former, and a series of controlling keys common to each clutch mechanism and its indicator.

11. In a computing machine or the like, provided with a plurality of registering members, an individual clutch mechanism for each registering member, intermediate transmitting mechanism between the clutch mechanism and the registering member, whereby the latter is actuated by the operation of the former, a series of controlling keys common to each individual clutch mechanism its corresponding registering member, and means operable at will for limiting the function of the keys as an operating element to that of a controlling element only.

12. In a computing machine or the like, provided with a plurality of registering members, suitable carrying mechanism, an individual clutch mechanism for each registering member, intermediate transmitting mechanism between the clutch mechanism and the registering member, whereby the latter is actuated by the operation of the former, a series of controlling keys common to each individual clutch mechanism and its corresponding registering member, and means whereby the function of the keys may be limited to that of a controlling element for the registering mechanism, as distinguished from an operating element therefor.

13. In a computing machine or the like, a plurality of registering members, an individual clutch mechanism for each registering member, intermediate transmitting mechanism between the clutch mechanism anh its respective registering member, whereby the latter is actuated by the operation of the former, driving mechanism for said clutch mechanism, a series of controlling keys for each individual clutch mechanism and its corresponding registering member, and auxiliary means independent of the keys for actuating the registering mechanism.

14. In a computing machine or the like, a plurality of registering members, suitable carrying mechanism, an individual clutch mechanism for each registering member, intermediate transmitting mechanism between the clutch mechanism and its respective registering member, whereby the latter is actuated by the operation of the former, driving mechanism for said clutch mechanism, a series of controlling keys for each individual clutch mechanism and its corresponding registering member, and means auxiliary to the operating keys arranged to coöperate with the transmitting mechanism to actuate said registering means at will.

15. In a computing machine, a plurality of registering members, a series of operating keys for each registering member, and intermediate transmitting mechanism between said keys and registering members in combination with supplemental operating mechanism, including suitable clutch mechanism arranged to coöperate with the transmitting means to actuate the registering members a distance dependent upon the particular key operated.

16. In a computing machine, a plurality of registering members, a series of operating keys for each registering member, intermediate transmitting mechanism between said keys and registering members, suitable carrier mechanism in combination with auxiliary operating mechanism, including clutch mechanism arranged to coöperate with the transmitting mechanism to actuate the registering members a limited distance dependent upon the particular key operated.

17. In a device of the kind described, a plurality of registering wheels, means for operating the same, suitable carrying mechanism, and mechanism for alining said members to clear the machine, in combination with a movable hand lever arranged to operate said alining means to normally disconnect therefrom, and engaging means positioned in proximity to said lever arranged to connect the alining means therewith by the hand grasping the said lever.

18. In a computing machine or the like, a plurality of registering members, a series of operating keys for each registering member, and intermediate transmitting mechanism between the operating keys and the registering members, whereby the latter may be actuated by the operation of the former, in combination with supplemental operating mechanism, including an oscillating shaft, and an operating lever therefor, arranged to coöperate with the transmitting mechanism to actuate said registering means.

19. In a computing machine or the like, a plurality of registering wheels, suitable carrying mechanism, a series of operating keys for each registering wheel, intermediate transmitting mechanism between said keys and registering wheels, whereby the latter may be actuated by the operation of the former, in combination with supplemental operating mechanism, including an oscillating shaft and an operating lever therefor, arranged to coöperate with the transmitting mechanism to actuate the registering wheels a distance dependent upon the key operated.

20. In a computing machine, a plurality of registering members, a series of operating keys for each registering member, intermediate transmitting mechanism between said keys and registering members, and suitable carrying mechanism, in combination with an oscillating shaft, an operating lever therefor, arranged to coöperate with the transmitting mechanism to actuate the registering members a distance dependent upon the particular key operated, and controlling means operable at will mounted upon the operating lever and arranged to coöperate with the transmitting mechanism to simultaneously advance all of the registering members to clear the machine.

21. In a computing machine or the like, a plurality of registering members, a series of operating keys for each registering member, and intermediate transmitting mechanism between said operating keys and registering members, whereby the latter may be actuated by the operation of the former, in combination with supplemental operating mechanism, including a driving member provided with clutch mechanism arranged to coöperate with said transmitting mechanism to actuate said registering members.

22. In a computing machine, a plurality of registering members, a series of operating keys for each registering member, and intermediate transmitting mechanism between said keys and registering members, in combination with supplemental operating mechanism, including a rotatable driving shaft provided with suitable clutch mechanism arranged to coöperate with the transmitting mechanism to actuate the registering members a distance dependent upon the particular key operated.

23. In a computing machine, a plurality of registering members, a series of operating keys for each registering member, intermediate transmitting mechanism between said keys and registering members, and suitable carrying mechanism, in combination with supplemental operating mechanism, including a rotatable driving shaft provided with suitable clutch mechanism arranged to coöperate with the transmitting mechanism to actuate the registering members a distance dependent upon the particular key operated.

24. A combined computing and printing machine of the kind described, comprising a plurality of registering members, a series of operating keys for each registering member, and intermediate transmitting mechanism between the operating keys and registering members, whereby the latter may be actuated by the operation of the former, in combination with printing mechanism, and means for operating the same, said means arranged to coöperate with said transmitting mechanism to actuate the registering wheels coincident with the operation of the printing mechanism.

25. A combined computing and printing machine of the kind described, comprising a plurality of registering members, a series of operating keys for each registering member, and intermediate transmitting mechanism between the operating keys and registering members, whereby the latter may be actuated by the operation of the former, in combination with printing mechanism, and means for operating the same, said means including an oscillating shaft and lever operatively connected with said transmitting mechanism and arranged to actuate the registering members coincident with the operation of the printing mechanism.

26. A combined computing and printing machine of the kind described, comprising a plurality of registering members, a series of operating keys for each registering member, and intermediate transmitting mechanism between the operating keys and registering members, whereby the latter may be actuated by the operation of the former, in combination with printing mechanism and operating means therefor, including a rotatable driving shaft and clutch mechanism arranged to coöperate with said transmitting mechanism to actuate the registering members coincident with the operation of the printing mechanism.

27. A combined computing and printing machine of the kind described, comprising a plurality of registering members, a series of operating keys for each registering member, and intermediate transmitting mechanism between the operating keys and registering members, whereby the latter may be actuated by the operation of the former, in combination with printing mechanism and operating means therefor, including an operating lever arranged to coöperate with said transmitting mechanism to actuate the registering members coincident with the operation of the printing mechanism, and means for clearing the machine, including means mounted upon said lever and operable by the hand grasping of said lever.

28. In a combined calculating and printing machine of the character described, comprising a plurality of registering members, an individual clutch device for each registering member, and intermediate transmitting mechanism between each clutch device and its registering member, whereby the latter may be actuated by the operation of the former, in combination with printing mechanism and operating means therefor, and a series of controlling keys common to the registering members, the clutch devices and the printing mechanism.

29. In a combined calculating and printing machine of the character described, a plurality of registering members, an individual clutch device for each registering member, intermediate transmitting mechanism between the clutch device and its respective registering member, whereby the latter may be actuated by the operation of the former, and suitable carrying mechanism, in combination with printing mechanism and operating means therefor, and a series of controlling keys common to the registering members, the clutch devices and the printing mechanism.

30. In a combined calculating and printing machine of the character described, a plurality of registering members, a clutch device for each registering member, intermediate transmitting mechanism between each clutch device and its corresponding registering member, whereby the latter may be actuated by the operation of the former, and a series of controlling keys common to each clutch device and its registering member, in combination with printing mechanism and operating means therefor, arranged to coöperate with the transmitting mechanism to actuate said registering members coincident with the operation of the printing mechanism.

31. In a combined calculating and printing machine of the character described, a series of registering wheels, a clutch device for each registering member, intermediate transmitting mechanism between the clutch devices and their corresponding registering members, and a series of controlling keys for each clutch device, and its registering member, in combination with printing mechanism and operating means therefor, arranged to coöperate with said transmitting mechanism and actuate the registering members a distance dependent upon the key operated coincident with the operation of the printing mechanism.

32. In a combined calculating and printing machine of the character described, a series of registering wheels, suitable carrying mechanism, a clutch device for each registering member, intermediate transmitting mechanism between the clutch devices and their corresponding registering members, and a series of controlling keys for each clutch device, and its registering member, in combination with printing mechanism and operating means therefor, arranged to coöperate with said transmitting mechanism and actuate the registering members a distance dependent upon the key operated coincident with the operation of the printing mechanism.

33. In a machine of the character described adapted to print individual items and accumulate the total thereof, a plurality of registering members, accumulating mechanism and printing mechanism and operating means therefor, in combination with means for clearing the machine, including an operating lever and intermediate transmitting mechanism between the registering members, and operating lever, and controlling means operative at will, mounted upon said operating lever, said controlling means arranged to coöperate with said transmitting mechanism and actuate the registering members, whereby the same are brought into alinement with each other.

34. In a device of the kind described, registering mechanism, a series of movable keys in combination with a driven shaft, clutch mechanism for said series of keys, arranged to be driven by said shaft, an intermediate mechanism between the keys and clutch mechanism whereby the operation of any key of the series will set up the amount indicated by the particular key and simultaneously release the clutch mechanism to complete the operation, advancing the registering mechanism a distance dependent upon the particular key operated.

35. In a device of the kind described, suitable registering mechanism, including carrying mechanism therefor, a plurality of series of movable keys, one for each order of numbers, and a setting up mechanism for each series of keys, in combination with a driven shaft, clutch mechanism for each series of keys arranged to be driven by said shaft, and intermediate mechanism between the keys of each series or order and the clutch mechanism of said series, whereby the operation of any key in each series will set up the amount indicated by the particular key operated, and also simultaneously release the clutch mechanism of that series, and the operation is thereby completed, advancing the registering mechanism a distance dependent upon the particular key operated.

36. In a device of the kind described, suitable registering mechanism including carrying means therefor, a plurality of series of movable keys, one for each order of numbers, and intermediate transmitting mechanism between the keys and the registering mechanism, whereby the latter may be operated by the movement of the former, in combination with a driven shaft, clutch mechanism for each series of keys arranged to be driven by said shaft, intermediate mechanism between the keys of each series and the clutch mechanism of said series, and means for throwing the said clutch mechanism into or out of operative connection with said transmitting mechanism at will, whereby the operation of any key in each series may itself operate the registering mechanism, or at will may serve to set up the amount indicated by the particular key, and also operatively release the clutch mechanism of that series or order, advancing the registering mechanism a distance dependent upon the particular key operated.

37. In a device of the kind described, suitable registering mechanism including carrying means, a plurality of series of movable keys, one for each order of numbers, setting up mechanism for each of said series or order of keys, intermediate mechanism between the keys and the registering mechanism, and means for throwing the setting up mechanism into or out of operation at will, in combination with a driven shaft, clutch mechanism for each series of keys arranged to be driven by said shaft, and intermediate mechanism between the keys of each series or order and the clutch mechanism of said series, whereby the device may at will be operated as a key operated device alone, or the keys may be employed as setting up means as well as releasing means for the clutches to constitute a power driven computing machine.

38. In a device of the kind described, suitable registering mechanism including carrying means, a plurality of series of movable keys, one series for each order of numbers, and intermediate transmitting mechanism between each series of keys and the registering mechanism, whereby the latter may be actuated by the operation of any key of a series, in combination with a driven shaft, clutch mechanism controlled by the operation of the keys for each series of keys, arranged to be driven by said shaft, and intermediate mechanism between the transmitting mechanism and its corresponding clutch mechanism, whereby the device may be actuated by the operation of the keys only or the keys may be also employed to control the transmitting mechanism and the clutch mechanism to constitute a power driven computing machine.

39. In a device of the kind described, suitable registering mechanism including carrying means, a plurality of series of movable keys, one series for each order of numbers, and intermediate transmitting mechanism, including setting up and controlling means between each series of keys and the registering mechanism, whereby the latter may be actuated by the operation of any key of a series, in combination with a driven shaft, clutch mechanism controlled by the operation of the keys for each series of keys, arranged to be driven by said shaft, and intermediate mechanism between the transmitting and setting up mechanism and its corresponding clutch mechanism, whereby the device may be actuated by the operation of the keys only or the keys may also be employed to control the transmitting mechanism and the clutch mechanism to constitute a power driven computing machine.

In testimony whereof, I have hereunto signed my name in the presence of two subscribing witnesses.

DANIEL W. SHIEK.

Witnesses:
 ROY W. HILL,
 CHARLES I. COBB.

Copies of this patent may be obtained for five cents each, by addressing the "Commissioner of Patents, Washington, D. C."